(12) United States Patent
Uhlirsch et al.

(10) Patent No.: US 12,503,126 B2
(45) Date of Patent: Dec. 23, 2025

(54) METHOD, SYSTEM AND COMPUTER PROGRAM PRODUCT FOR PERFORMING AN ON-BOARD DIAGNOSTIC FUNCTION IN A MOTOR VEHICLE

(71) Applicant: Dr. Ing. h.c. F. Porsche Aktiengesellschaft, Stuttgart (DE)

(72) Inventors: Ulrich Franz Uhlirsch, Blaustein-Herrlingen (DE); Steffen Buck, Metzingen (DE); Dominik Kohl, Neuenbürg (DE); Kai Austel, Oberkirch (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 222 days.

(21) Appl. No.: 17/955,643

(22) Filed: Sep. 29, 2022

(65) Prior Publication Data
US 2023/0100949 A1    Mar. 30, 2023

(30) Foreign Application Priority Data
Sep. 30, 2021   (DE) .................... 10 2021 125 404.3

(51) Int. Cl.
*B60W 50/04*    (2006.01)
*F01N 11/00*    (2006.01)
(Continued)

(52) U.S. Cl.
CPC ........... *B60W 50/045* (2013.01); *F01N 11/00* (2013.01); *G07C 5/0808* (2013.01);
(Continued)

(58) Field of Classification Search
CPC ....... B60W 50/045; B60W 2050/0052; B60W 2510/06; B60W 2510/08; B60W 2510/28;
(Continued)

(56) References Cited

U.S. PATENT DOCUMENTS

| 8,831,818 B2 | 9/2014 | Park |
| 10,378,470 B2 | 8/2019 | Magner et al. |
| (Continued) | | |

FOREIGN PATENT DOCUMENTS

| CN | 112814783 A | 5/2021 |
| DE | 102011109084 A1 | 2/2013 |
| (Continued) | | |

OTHER PUBLICATIONS

Office Action (The First Office Action) issued Oct. 15, 2024 by the State Intellectual Property Office of People's Republic of China in corresponding Chinese Patent Application No. 202210692805.1 and an English translation. (36 pages).
(Continued)

*Primary Examiner* — Gonzalo Laguarda
(74) *Attorney, Agent, or Firm* — Buchanan Ingersoll & Rooney PC

(57) ABSTRACT

A method for performing an on-board diagnostic function in a motor vehicle including at least one drive system, at least one operating element and at least one control unit with a processor, a control module and an on-board diagnostic function module. The method includes the steps of: activating an on-board diagnostic function in the on-board diagnostic function module; supplying a first signal profile (S1) of an operating value (CV) of the operating element to an analysis module; the analysis module analyzing the first signal profile (S1) of the operating value (CV); activating a filtering module in the event of a positive analysis result; and the filtering module filtering the first signal profile (S1) of the operating value (CV) with selected damping parameters (DP) upon activation of the filtering module in order to obtain a filtered second signal profile (S2) of the operating element.

19 Claims, 2 Drawing Sheets

(51) Int. Cl.
    *G07C 5/08* (2006.01)
    *B60W 50/00* (2006.01)
(52) U.S. Cl.
    CPC . *B60W 2050/0052* (2013.01); *B60W 2510/06* (2013.01); *B60W 2510/08* (2013.01); *B60W 2510/28* (2013.01); *B60W 2540/10* (2013.01)
(58) Field of Classification Search
    CPC ... B60W 2540/10; F01N 11/00; G07C 5/0808
    See application file for complete search history.

(56) References Cited

U.S. PATENT DOCUMENTS

| | | | |
|---|---|---|---|
| 10,703,358 B2 * | 7/2020 | Ransberger | F02D 41/22 |
| 10,787,165 B2 * | 9/2020 | Park | B60W 30/182 |
| 10,928,275 B1 | 2/2021 | Dadam et al. | |
| 2020/0027289 A1 | 1/2020 | Jost et al. | |

FOREIGN PATENT DOCUMENTS

| | | |
|---|---|---|
| DE | 102012222408 A1 | 2/2014 |
| DE | 102018113767 A1 | 12/2018 |
| DE | 102018215630 A1 | 3/2020 |
| KR | 20070072205 A | 7/2007 |
| WO | 2015158594 A1 | 10/2015 |

OTHER PUBLICATIONS

Xu, J.P., "A Safety Control Strategy for Vehicle Driving Dynamics", Automotive Engineering, (Dec. 30, 2004), vol. 26(6), 6 pages. (English abstract only).

Search Report issued Aug. 11, 2025, in corresponding Chinese Patent Application No. 202210692805.1. (2 pages).

* cited by examiner

METHOD, SYSTEM AND COMPUTER PROGRAM PRODUCT FOR PERFORMING AN ON-BOARD DIAGNOSTIC FUNCTION IN A MOTOR VEHICLE

CROSS-REFERENCE TO RELATED APPLICATION

This application claims priority to German Patent Application No. 10 2021 125 404.3, filed Sep. 30, 2021, the content of such application being incorporated by reference herein in its entirety.

FIELD OF THE INVENTION

The present invention relates to a method, a system and a computer program product for performing an on-board diagnostic function in a motor vehicle.

BACKGROUND OF THE INVENTION

In motor vehicles, on-board diagnostic functions (OBD) are used to monitor the function of the motor vehicle and, in particular, of the drive system. In motor vehicles having an zo internal combustion engine, the internal combustion engine and/or other systems which influence the exhaust gas are monitored, in particular, during operation of the motor vehicle. Fault states can be detected and displayed in this case.

However, some on-board diagnostic functions can be performed only in driving situations with low dynamics based on the engine speed and/or the air mass flow, since an operating point of the internal combustion engine that is as constant as possible is required in an internal combustion engine, for example. Therefore, in conventional motor vehicles, diagnosis is often aborted when the driver changes to a dynamic operating mode. This concerns, in particular, the parallel analysis and diagnosis of various technical parameters and devices, for example the catalytic converter diagnosis, the diagnosis of cylinder equalization in multi-cylinder engines, or the diagnosis of the tank venting valve. A dynamic style of driving can therefore result in the on-board diagnostic functions not being performed with sufficient frequency or not providing any reliable results. In addition, the increased attempts at diagnosis result in impairment of the exhaust gas values and the supply of fresh air.

DE 10 2012 222 408 A1, which is incorporated by reference herein, discloses a diagnostic method for an oxygen sensor in a hybrid vehicle, wherein an internal combustion engine is operated at a defined engine speed during an oxygen diagnostic function.

DE 10 2011 109 084 A1, which is incorporated by reference herein, discloses a method for detecting misfires in an internal combustion engine by means of an on-board diagnostic system, wherein, in order to determine the misfires in a manner which is less susceptible to interference during a coasting operating state with deceleration of the motor vehicle, despite a slightly fired internal combustion engine, a brief gas blast of the internal combustion engine at a predefined speed of the internal combustion engine is provided.

SUMMARY OF THE INVENTION

Described herein is a method, a system and a computer program product for performing an on-board diagnostic function in a motor vehicle, distinguished by a high degree of operational stability and reliable diagnostic results.

According to a first aspect, the invention relates to a method for performing an on-board diagnostic function in a motor vehicle comprising at least one drive system, at least one operating element and at least one control unit with a processor, a control module and an on-board diagnostic function module. The method comprises the following method steps of:

activating an on-board diagnostic function in the on-board diagnostic function module;

supplying a first signal profile S1 of an operating value CV of the operating element to an analysis module;

the analysis module analyzing the first signal profile S1 of the operating value CV;

activating a filtering module in the event of a positive analysis result; or deactivating the filtering module and the on-board diagnostic function in the event of a negative analysis result, and forwarding the first signal profile S1 of the operating value CV to the control module;

the filtering module filtering the first signal profile S1 of the operating value CV with selected damping parameters DP upon activation of the filtering module in order to obtain a filtered second signal profile S2 of the operating element;

forwarding the filtered second signal profile S2 of the operating value CV to the control module;

the control module generating a control signal ST on the basis of the available first signal profile S1 or the available filtered second signal profile S2;

transmitting the control signal ST to the drive system of the motor vehicle.

This makes it possible to improve the stability of the performance of on-board diagnostic functions since they are performed only when there are suitable boundary conditions on account of the driving behavior.

One development provides for the drive system to comprise a conventional internal combustion engine, or an internal combustion engine and at least one electric motor for a hybrid drive, or at least one electric motor, or at least one fuel cell.

In particular, the operating element is in the form of a gas pedal and the operating value CV corresponds to a gas pedal value.

In one advantageous embodiment, the damping parameters DP comprise limit values or mathematical functions.

In particular, provision is made for the analysis module to use algorithms to analyze the first signal profile S1 of the operating element and to calculate the damping parameters DP.

Artificial intelligence algorithms such as neural networks or deep learning are advantageously used.

In a further embodiment, performance of on-board diagnostic functions is deactivated on the basis of particular route guidance.

One development provides for the damping parameters DP to be adapted on the basis of the first signal profile S1 of the operating element and/or the type of on-board diagnostic function.

In particular, the on-board diagnostic function comprises a catalytic converter diagnostic function, a cylinder equalization diagnostic function, a tank venting valve diagnostic function and/or a lambda adaptation diagnostic function.

According to a second aspect, the invention relates to a system for performing an on-board diagnostic function in a motor vehicle comprising a drive system, at least one operating element and a control unit with a processor, a control module, an on-board diagnostic function module, a filtering module and an analysis module. The control unit is designed such that an on-board diagnostic function in the on-board diagnostic function module is activated and a first signal profile S1 of an operating value CV of the operating element is supplied to the analysis module. The analysis module is designed to analyze the first signal profile S1 of the operating value CV and to activate the filtering module in the event of a positive analysis result or to deactivate the filtering module and the on-board diagnostic function in the event of a negative analysis result and to forward the first signal profile CV of the operating value CV to the control module. The filtering module, upon activation, is designed to filter the first signal profile S1 of the operating value CV with selected damping parameters DP in order to obtain a filtered second signal profile S2 and to forward the filtered second signal profile S2 of the operating value CV to the control module. The control module is designed to generate a control signal ST on the basis of the available first signal profile S1 or the filtered second signal profile S2 and to transmit the control signal ST to the drive system of the motor vehicle.

One further development provides for the drive system to comprise a conventional internal combustion engine, or an internal combustion engine and at least one electric motor for a hybrid drive, or at least one electric motor, or at least one fuel cell, and for the operating element to be in the form of a gas pedal and for the operating value CV to correspond to a gas pedal value.

In particular, provision is made for the damping parameters DP to comprise limit values or mathematical functions.

The analysis module advantageously uses algorithms to analyze the first signal profile S1 of the operating element and to calculate the damping parameters DP, in particular artificial intelligence algorithms such as neural networks or deep learning.

One advantageous embodiment provides for the analysis module and/or the filtering module to be designed to adapt the damping parameters DP on the basis of the first signal profile S1 of the operating element and/or the type of on-board diagnostic function.

According to a third aspect, the invention provides a computer program product comprising an executable program code which is configured to carry out the method according to the first aspect.

BRIEF DESCRIPTION OF THE DRAWINGS

Further features, aspects and advantages of the invention or of its embodiments are explained in the detailed description in conjunction with the following figures.

In the figures.

DETAILED DESCRIPTION OF THE INVENTION

Specific details are presented in the following description for the purpose of explanation and not for limitation, in order to enable an in-depth understanding of the present invention. It is obvious to a person skilled in the art that the present invention can be executed in other implementations which differ from these specific details.

Figure 1:
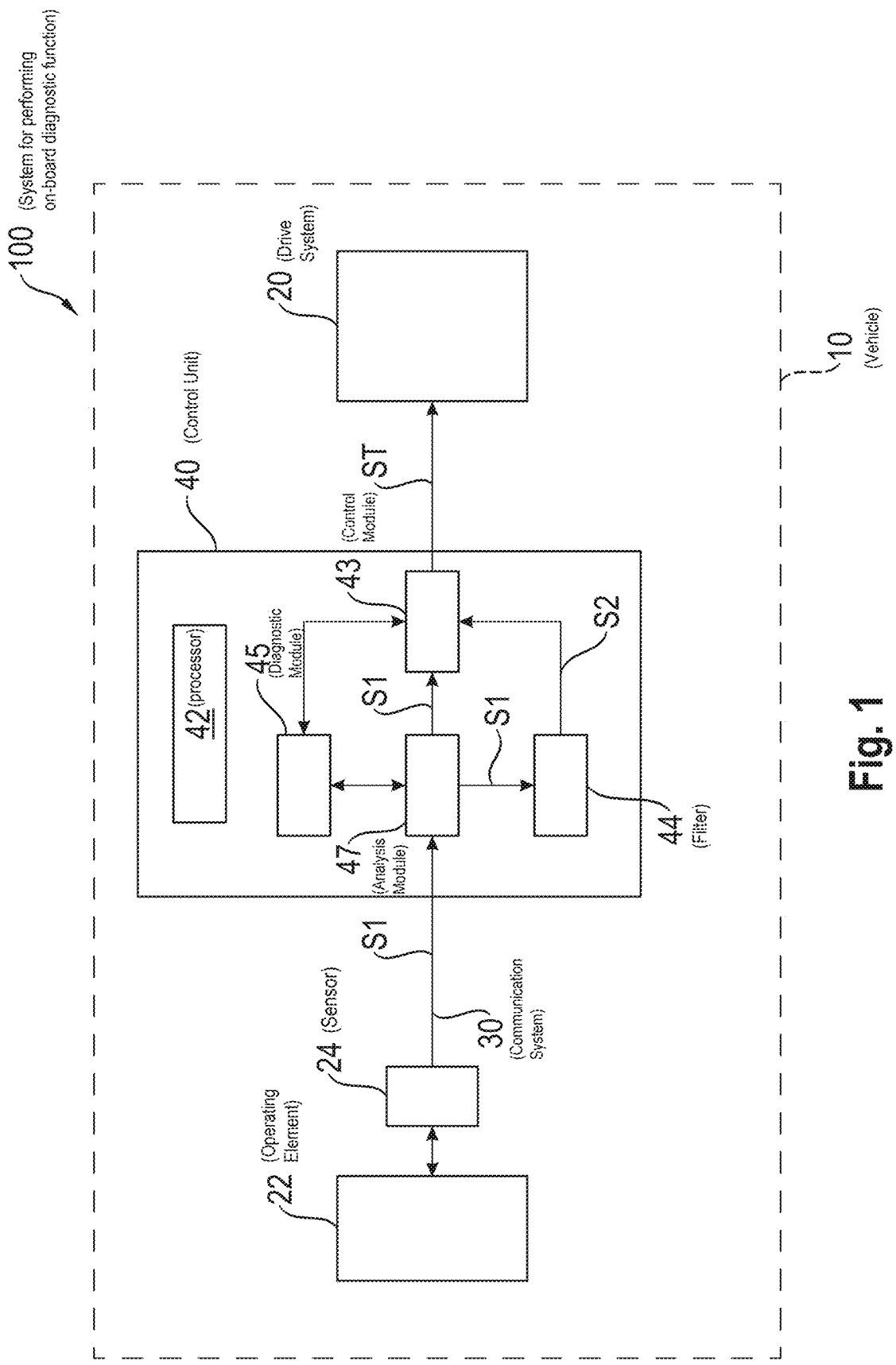
FIG. 1 shows a schematic illustration of the system according to aspects of the invention.

FIG. 1 illustrates a system 100 for performing an on-board diagnostic function in a motor vehicle 10. The motor vehicle 10 is driven by a drive system 20. The drive system 20 may comprise a conventional internal combustion engine, or an internal combustion engine and at least one electric motor for a hybrid drive, or at least one electric motor, or at least one fuel cell. A data communication system 30 is also provided and communicates with the drive system 20 as well as various motor vehicle modules and sensors. The data communication system 30 may be in the form of a CAN (Control Area Network) bus.

The system 100 has an operating element 22 such as, in particular, a gas pedal which is operated by a driver of the motor vehicle 10. However, it may also be a rotary knob or a joystick, for example. A sensor 24 captures an operating value CV of the operating element 22 such as, in particular, a gas pedal value which represents the position of a gas pedal. The sensor 24 forwards the operating value CV to a control unit 40 of the motor vehicle 20, in particular by means of the data communication system 30. On the basis of the operating value CV, the control unit 40 generates a control signal ST for controlling the internal combustion engine 20.

The control unit 40 comprises at least a processor 42, a control module 43, a filtering module 44, an on-board diagnostic function module 45 and an analysis module 47.

In connection with the invention, a "processor" can be understood as meaning a machine or an electronic circuit, for example. A processor may be, in particular, a main processor (Central Processing Unit, CPU), a microprocessor or a microcontroller, for example an application-specific integrated circuit or a digital signal processor, possibly in combination with a memory unit for storing program instructions, etc. A processor may also be understood as meaning a virtualized processor, a virtual machine or a soft CPU. It may also be, for example, a programmable processor which is equipped with configuration steps for carrying out said method according to aspects of the invention or is configured with configuration steps such that the programmable processor implements the features according to aspects of the invention of the method, the component, the modules or other aspects and/or partial aspects of the invention.

In connection with the invention, a "module" can be understood as meaning, for example, a processor and/or a memory unit for storing program instructions. For example, a module is specifically configured to execute program instructions and functions so as to implement or carry out the method according to aspects of the invention or a step of the method according to aspects of the invention.

The on-board diagnostic functions are, for example, a catalytic converter diagnostic function, a cylinder equalization diagnostic function, a tank venting valve diagnostic function, a valve travel diagnostic function or a lambda adaptation diagnostic function. However, in an internal combustion engine, the on-board diagnostic functions can be performed only in driving situations with low dynamics of the engine speed and/or of the air mass flow since the operating point of the internal combustion engine must be kept virtually constant while performing the diagnosis in order to avoid distortion of the diagnostic result.

According to aspects of the invention, a recorded first signal profile S1 of the operating value CV is supplied to the filtering module 44 of the control unit 40. If the on-board diagnostic function module 45 is not activated, the first signal profile S1 of the operating value CV is not changed by the filtering module 44 and the unfiltered signal profile S1 of the operating value CV forms the basis for generating an unfiltered control signal ST for the drive system 20. This means that a drive torque of the drive system 20 is determined substantially only by the signal profile S1 of the operating value CV of the operating element 22.

In contrast, if the on-board diagnostic function module 45 for performing an on-board diagnostic function is activated, the first signal profile S1 of the operating value CV is filtered in such a manner that stable performance of the on-board diagnostic function is ensured by means of a filtered second signal profile S2 of the operating element 22. On the basis of the filtered second signal profile S2 of the operating value CV, the control unit 40 outputs a filtered control signal ST to the drive system 20, which ensures an operating mode of the drive system 20 for performing the on-board diagnostic function in a stable manner. This means that the actual drive torque of the drive system 20 is decoupled from the actual signal profile S1 of the operating value CV of the operating element 22 while performing the on-board diagnostic function.

Damping parameters DP are provided for filtering the first signal profile S1 of the operating value CV of the operating element 22. The damping parameters DP may be, for example, limit values or mathematical functions. In addition, the damping parameters DP may be specifically defined for the respective on-board diagnostic functions. For example, for a parallel diagnosis of motor vehicle functions such as a catalytic converter diagnosis, a diagnosis of the cylinder equalization in multi-cylinder engines or a diagnosis of the tank venting valve, it is possible to provide a damping parameter DP which controls the constancy of the operating point of the drive system 20 in a very narrow range, whereas a greater range is permitted for an individual diagnosis, for example of the lambda probe. When the drive system 20 is in the form of an internal combustion engine, the filtering according to aspects of the invention of the first signal profile S1 of the gas pedal value therefore keeps the operating point of the internal combustion engine constant.

So that the filtering functions and on-board diagnostic functions are not perceived to be disruptive by the driver and in order to additionally prevent safety-critical driving situations, the first signal profile S1 of the operating value CV is supplied to an analysis module 47. The analysis module 47 has algorithms for analyzing measurement data and for calculating operating parameters, in particular for controlling the filtering module 44. For example, the damping parameters DP may be calculated and determined in the analysis module 47. The algorithms of the analysis module 47 may comprise, in particular, artificial intelligence algorithms such as neural networks or deep learning.

In the analysis module 47, the first signal profile S1 of the operating value CV is differentiated, in particular, in order to determine the temporal change of the signal profile S1 of the operating value CV. Integration of the signal profile S1 of the operating value CV may also be provided. If a fast and pronounced change in the operating value CV is determined in this case, the filtering module 44 is deactivated. In an internal combustion engine, this means that, if the gas pedal is depressed quickly and forcefully, a critical driving situation which requires fast and high acceleration, for example, is assumed.

Provision may also be made for further sensor signals from other motor vehicle devices such as, in particular, the brake systems to be supplied to the analysis module 47. If the analysis module 47 determines a critical driving situation on the basis of the input measurement data from the sensors, this is assessed as a negative analysis result with respect to the performance of an on-board diagnostic function and the analysis module 47 transmits a control command to the filtering module 44 for deactivating the filtering. Since the first signal profile S1 of the operating value CV is filtered in the filtering module 44 only when the analysis module 47 has previously classified this as positive, the adaptation of the operating mode of the drive system 20 for performing an on-board diagnostic function is not perceived to be disruptive by the driver of the motor vehicle 20.

A further development may also provide for on-board diagnostic functions not to be performed when starting the motor vehicle 10 or on the basis of particular route guidance. For this purpose, the analysis module 47 may be connected to a navigation unit of the motor vehicle 10 and/or to further memory modules and/or databases and uses the received data to determine whether it is necessary to deactivate on-board diagnostic functions.

Provision may also be made for the values of the damping parameters DP to be changed on the basis of the temporal course of a route and/or a route section and/or the number of on-board diagnostic functions which have already been performed. In particular, the analysis module 47 may also be connected to an image and sensor device, with the result that a driving situation is assessed by the analysis module 47 on the basis of the recorded image data and measurement data. If a driving situation is classified as critical, the filtering module 44 and/or the on-board diagnostic function module 45 is/are deactivated by the analysis module 47 since the analysis result has been assessed to be negative for the performance of an on-board diagnostic function.

Figure 2:
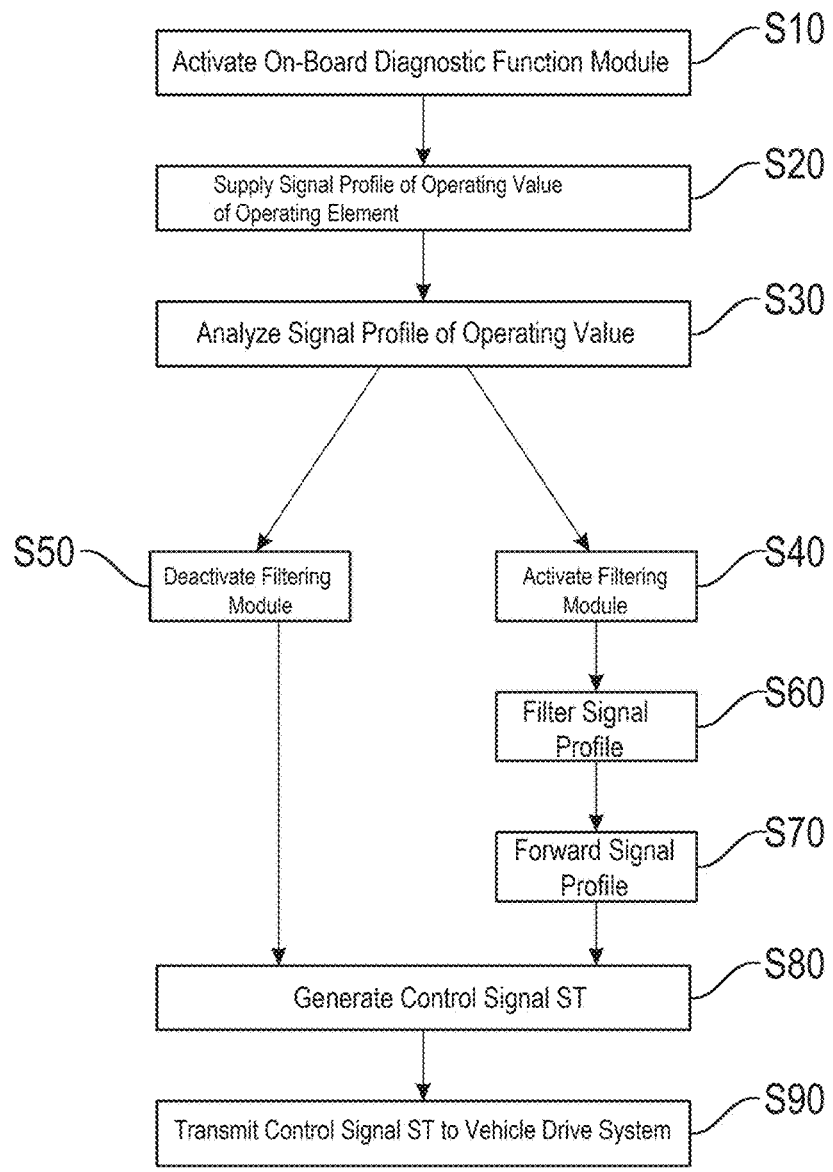
FIG. 2 shows a flowchart for explaining the individual method steps of the method according to aspects of the invention.

FIG. 2 illustrates the method steps of the method according to aspects of the invention.

In a step S10, an on-board diagnostic function in an on-board diagnostic function module 45 in a motor vehicle 10 is activated.

In a step S20, a first signal profile S1 of an operating value CV of an operating element 22 of the motor vehicle 10 is supplied to an analysis module 47.

In a step S30, the first signal profile S1 of the operating value CV is analyzed by the analysis module 47.

In a step S40, a filtering module 44 is activated in the event of a positive analysis result.

In a step S50, the on-board diagnostic function and the filtering module 44 are deactivated in the event of a negative analysis result and the first signal profile S1 of the operating value CV is forwarded to a control module 43.

In a step S60, upon activation of the filtering module 44, the first signal profile S1 of the operating value CV is filtered by the filtering module 44 with selected damping parameters DP in order to obtain a filtered second signal profile S2 of the operating value CV.

In a step S70, the filtered second signal profile S2 of the operating value CV is forwarded to the control module 43.

In a step S80, the control module 43 generates a control signal ST on the basis of the available unfiltered first signal profile S1 or the filtered second signal profile S2.

In a step S90, the control signal ST is transmitted to the drive system 20 of the motor vehicle 10.

Figure 3:
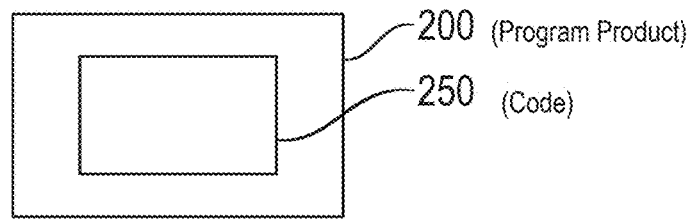
FIG. 3 schematically shows a computer program product according to one embodiment of the third aspect of the invention.

FIG. 3 schematically illustrates a computer program product 200 comprising an executable program code 250 which is configured to carry out the method according to the first aspect of the present invention.

According to aspects of the invention, the first signal profile S1 of the operating value CV of an operating element 22 is assessed by an analysis module 47 before it is supplied to filtering with damping parameters DP. This makes it possible to improve the stability of the performance of on-board diagnostic functions since they are performed only when there are suitable boundary conditions on account of the driving behavior. In addition, the damping parameters DP can be adapted to a driving situation, with the result that it is possible to carry out dynamic filtering of the signal profile S1 of the operating value CV and therefore control of the drive system 20 on the basis of the driving situation that is actually present. This increases the safety when performing on-board diagnostic functions but also the efficiency since aborted on-board diagnostic functions can be avoided and environmental compatibility can therefore be increased.

REFERENCE SIGNS

10 Motor vehicle
20 Drive system
22 Operating element
24 Sensor
30 Data communication system
40 Control unit
42 Processor
43 Control module
44 Filtering module
45 On-board diagnostic function module
47 Analysis module
100 System
200 Computer program product
250 Program code
CV Operating value
DP Damping parameter
S1 Unfiltered first signal profile
S2 Filtered second signal profile
ST Control signal

What is claimed is:
1. A method for performing an on-board catalytic converter diagnostic function in a motor vehicle including at least one drive system in the form of an internal combustion engine, at least one operating element in the form of an accelerator pedal, knob or joystick, at least one control unit with a processor, a control module and an on-board catalytic converter diagnostic function module, said method comprising the steps of:
   activating (S10) an on-board catalytic converter diagnostic function in the on-board catalytic converter diagnostic function module;
   supplying (S20) a first signal profile (S1) of an operating value (CV) of the operating element to an analysis module, the operating value (CV) corresponding to a position of the accelerator pedal, knob or joystick;
   the analysis module analyzing (S30) the first signal profile (S1) of the operating value (CV);
   either (i) activating (S40) a filtering module in an event of a positive analysis result associated with a temporal change of the first signal profile (S1) being less than a pre-determined value and representative of a normal driving situation or (ii) deactivating (S50) the filtering module and the on-board diagnostic function in an event of a negative analysis result associated with a temporal change of the first signal profile (S1) being greater than a pre-determined value and representative of a critical driving situation, and forwarding the first signal profile (S1) of the operating value (CV) to the control module;
   filtering (S60) the first signal profile (S1) of the operating value (CV) by the filtering module with selected damping parameters (DP) associated with the catalytic converter diagnostic function upon activation of the filtering module in order to obtain a filtered second signal profile (S2) of the operating element;
   forwarding (S70) the filtered second signal profile (S2) of the operating value (CV) to the control module;
   generating (S80) a drive torque control signal (ST) at the control module on the basis of the first signal profile (S1) or the filtered second signal profile (S2), wherein, when the drive torque control signal (ST) is based on the signal profile (S1), a drive torque of the drive system is based solely on the signal profile (S1), and, wherein when the drive torque control signal (ST) is based on the filtered second signal profile (S2), the method additionally comprises performing the catalytic converter diagnostic function while the drive torque of the drive system is decoupled from the signal profile (S1) and remains substantially constant for purposes of performing the catalytic converter diagnostic function; and
   transmitting (S90) the drive torque control signal (ST) to the drive system of the motor vehicle to cause movement of the motor vehicle,
   wherein all of the steps of the method are performed during operation of the internal combustion engine.

2. The method as claimed in claim 1, wherein the drive system further comprises at least one electric motor for a hybrid drive, or at least one electric motor, or at least one fuel cell.

3. The method as claimed in claim 1, wherein the damping parameters (DP) comprise limit values or mathematical functions.

4. The method as claimed in claim 1, wherein the analysis module uses algorithms to analyze the first signal profile (S1) of the operating element and to calculate the damping parameters (DP).

5. The method as claimed in claim 4, wherein the algorithms include either neural networks or deep learning.

6. The method as claimed in claim 1, further comprising deactivating on-board diagnostic functions on a basis of a particular route guidance.

7. The method as claimed in claim 1, further comprising additionally adapting the damping parameters (DP) on a basis of the first signal profile (S1) of the operating element.

8. A computer program product comprising an executable program code which is configured to carry out the method as claimed in claim 1.

9. The method according to claim 1, wherein the at least one operating element comprises the accelerator pedal.

10. The method according to claim 1, wherein said method comprises activating (S40) the filtering module in the event of the positive analysis result associated with the temporal change of the first signal profile (S1) being less than the pre-determined value and representative of the normal driving situation.

11. A system for performing an on-board catalytic converter diagnostic function in a motor vehicle, the system comprising a control unit with a processor, a control module, an on-board catalytic converter diagnostic function module, a filtering module and an analysis module,
   wherein, during operation of the motor vehicle, the control unit is configured to (i) activate an on-board catalytic converter diagnostic function in the on-board catalytic converter diagnostic function module, and (ii) supply a first signal profile (S1) of an operating value (CV) of at least one operating element in the form of an accelerator pedal, knob or joystick of the motor vehicle to the analysis module, the operating value (CV) corresponding to a position of the accelerator pedal, knob or joystick;

wherein, during operation of the motor vehicle, the analysis module is configured to (i) analyze the first signal profile (S1) of the operating value (CV) and (ii) either (a) activate the filtering module in the event of a positive analysis result associated with a temporal change of the first signal profile (S1) being less than a pre-determined value and representative of a normal driving situation or (b) deactivate the filtering module and the on-board diagnostic function in an event of a negative analysis result associated with a temporal change of the first signal profile (S1) being greater than a pre-determined value and representative of a critical driving situation and forward the first signal profile (CV) of the operating value (CV) to the control module;

wherein, during operation of the motor vehicle, the filtering module, upon activation, is configured to (i) filter the first signal profile (S1) of the operating value (CV) with selected damping parameters (DP) associated with the catalytic converter diagnostic function in order to obtain a filtered second signal profile (S2) and (ii) forward the filtered second signal profile (S2) of the operating value (CV) to the control module;

wherein, during operation of the motor vehicle, the control module is configured to (i) generate a drive torque control signal (ST) on a basis of the first signal profile (S1) or the filtered second signal profile (S2) and (ii) transmit the drive torque control signal (ST) to a drive system of the motor vehicle in the form of an internal combustion engine in order to cause movement of the motor vehicle, wherein, during operation of the motor vehicle, when the drive torque control signal (ST) is based on the signal profile (S1), a drive torque of the drive system is based solely on the signal profile (S1), and, wherein when the drive torque control signal (ST) is based on the filtered second signal profile (S2), the control module is additionally configured to perform the catalytic converter diagnostic function while the drive torque of the drive system is decoupled from the signal profile (S1) and remains substantially constant for purposes of performing the catalytic converter diagnostic function.

12. The system as claimed in claim 11, wherein the drive system further comprises at least one electric motor for a hybrid drive, or at least one electric motor, or at least one fuel cell, and wherein the operating element is in the form of the accelerator pedal and the operating value (CV) corresponds to an accelerator pedal value.

13. The system as claimed in claim 11, wherein the damping parameters (DP) comprise limit values or mathematical functions.

14. The system as claimed in claim 11, wherein the analysis module is configured to use algorithms in the form of either neural networks or deep learning to analyze the first signal profile (S1) of the operating element and to calculate the damping parameters (DP).

15. The system as claimed in claim 11, wherein the analysis module and/or the filtering module is/are configured to additionally adapt the damping parameters (DP) on a basis of the first signal profile (S1) of the operating element.

16. A vehicle comprising the system as claimed in claim 11.

17. The system as claimed in claim 11 further comprising the drive system and the operating element of the motor vehicle.

18. The system according to claim 11, wherein the at least one operating element comprises the accelerator pedal.

19. The system according to claim 11, wherein the analysis module activates the filtering module in the event of the positive analysis result associated with the temporal change of the first signal profile (S1) being less than the pre-determined value and representative of the normal driving situation.

* * * * *